US008817185B2

(12) United States Patent
Kazawa

(10) Patent No.: US 8,817,185 B2
(45) Date of Patent: Aug. 26, 2014

(54) ELECTRONIC DEVICE, CONTROL METHOD, AND CONTROL PROGRAM PRODUCT

(71) Applicant: Kabushiki Kaisha Toshiba, Tokyo (JP)

(72) Inventor: Hiroshi Kazawa, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/904,644

(22) Filed: May 29, 2013

(65) Prior Publication Data

US 2014/0152895 A1 Jun. 5, 2014

(30) Foreign Application Priority Data

Dec. 5, 2012 (JP) ................................. 2012-266102

(51) Int. Cl.
*H04N 7/00* (2011.01)
*H04N 11/00* (2006.01)

(52) U.S. Cl.
USPC ........... 348/552; 348/565; 348/575; 348/521; 348/516; 348/515; 348/513; 348/501; 348/500; 348/525; 348/608; 348/636; 348/680; 348/682; 348/693; 348/734; 348/725; 348/727; 348/731; 348/723; 348/423.1; 348/425.4; 348/462; 348/464; 348/468; 348/492; 348/189; 348/194; 725/39; 725/38; 725/68; 725/123; 340/5.8

(58) Field of Classification Search
USPC ......... 348/552, 734, 492, 565, 636, 680, 693, 348/725, 727, 731, 500, 501, 515, 513, 575, 348/723, 468, 464, 462, 425.4, 423.1, 608, 348/189, 194, 521, 516; 725/39, 38, 68; 725/123; 340/5.8

See application file for complete search history.

(56) References Cited

U.S. PATENT DOCUMENTS

2007/0140648 A1* 6/2007 Takahashi ....................... 386/68
2011/0138416 A1* 6/2011 Kang et al. ...................... 725/39
2012/0099025 A1* 4/2012 Kanda ........................... 348/734
2012/0182203 A1* 7/2012 Yoshikawa ..................... 345/1.3

FOREIGN PATENT DOCUMENTS

| JP | 2005-286845 | 10/2005 |
| JP | 2008-124770 | 5/2008 |
| JP | 2009-147575 | 7/2009 |
| JP | 2010-093886 | 4/2010 |

* cited by examiner

*Primary Examiner* — Jefferey Harold
*Assistant Examiner* — Mustafizur Rahman
(74) *Attorney, Agent, or Firm* — Blakely, Sokoloff, Taylor & Zafman LLP

(57) ABSTRACT

According to one embodiment, an electronic device includes a reproduction controller and a transmitter. The reproduction controller is configured to reproduce a first type of information of a first content. The first content includes a plurality of types of information. The transmitter is configured to transmit an instruction to reproduce a second type of information of the first content to other electronic device.

18 Claims, 10 Drawing Sheets

ELECTRONIC DEVICE, CONTROL METHOD, AND CONTROL PROGRAM PRODUCT

CROSS-REFERENCE TO RELATED APPLICATIONS

This application is based upon and claims the benefit of priority from Japanese Patent Application No. 2012-266102, filed Dec. 5, 2012, the entire contents of which are incorporated herein by reference.

FIELD

Embodiments described herein relate generally to reproduction of contents such as a moving image or music.

BACKGROUND

In recent years, widespread use of networks and computers has involved a trend of connecting home electronic devices via a network. For example, television display devices and tablet computers are becoming generally used as the electronic devices that are connectable to each other via the network.

These electronic devices tend to have a function of reproducing contents from a storage (such as a network attached storage [NAS]) that is connected via a local area network (LAN).

Thereby, a user can, for example, operate a tablet computer so as to instruct a television display device connected thereto via the LAN to reproduce a moving image content that has been reproduced on the tablet computer. In this manner, the user can switch the reproduction of the moving image content among a plurality of electronic devices.

However, although the reproduction of the moving image content is performed in a single electronic device in conventional techniques, there are demands for reproducing a video image and a sound of the moving image content separately on different electronic devices.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a reproduction controller and a transmitter. The reproduction controller is configured to reproduce a first type of information of a first content. The first content comprises a plurality of types of information. The transmitter is configured to transmit an instruction to reproduce a second type of information of the first content to other electronic device.

A description will be made below of an embodiment to which electronic devices are applied. Note that, in the embodiment below, examples will be described in which a network environment is established at a home provided with a plurality of electronic devices. The network environment can be considered to be established by a method such as using devices conforming to Digital Living Network Alliance (DLNA) guidelines as the electronic devices, and connecting them on the network. However, any method can be used.

Figure 1:
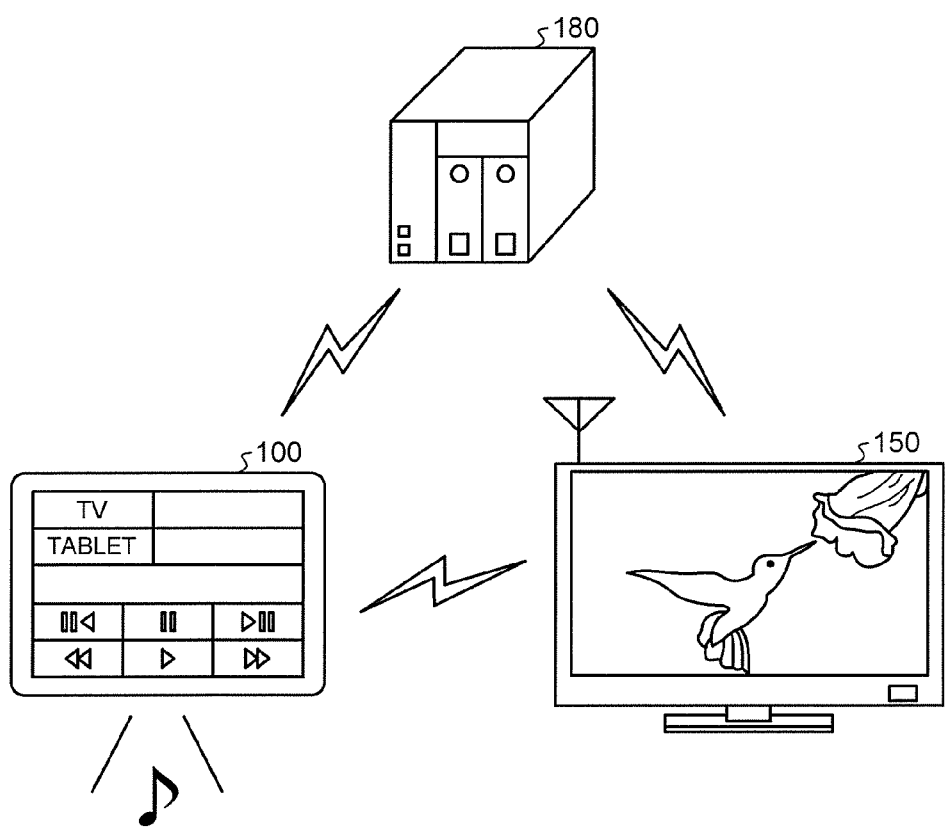
FIG. 1 is an exemplary diagram of a configuration of a network system according to a first embodiment.

In a network system illustrated in FIG. 1, a tablet terminal 100, a television display device 150, and a network attached storage (NAS) 180 are connected to each other via the network. The network can be a wired or a wireless network, or a mixed network thereof. Note that, although the present embodiment describes the examples of using the tablet terminal 100 and the television display device 150 as the electronic devices, numbers and types of the electronic devices connected to the network are not limited to those in the aspect described in the present embodiment, but various aspects can be considered.

The NAS 180 comprises a built-in or external HDD, in which video contents are stored. The NAS 180 can transmit the video content in response to a request from the electronic device (such as the tablet terminal 100 or the television display device 150). Transmitting and receiving of the video content can be considered to be achieved, for example, such that the NAS 180 serves as a DLNA server while the tablet terminal 100 and the television display device 150 each serves as a DLNA client, a DLNA renderer, or a DLNA controller.

With this configuration, for example, after reproducing the video content provided from the NAS 180 on the tablet terminal 100, a user can operate the tablet terminal 100 to switch the reproduction of the video content delivered from the NAS 180 to the television display device 150.

In addition, in the present embodiment, an example will be described in which an arbitrary video content stored in the NAS 180 is reproduced on more than one of the electronic devices. In particular, an example will be described in which video image data included in the video content is reproduced on the television display device 150 while audio data included in the video content is reproduced on the tablet terminal 100.

Figure 2:
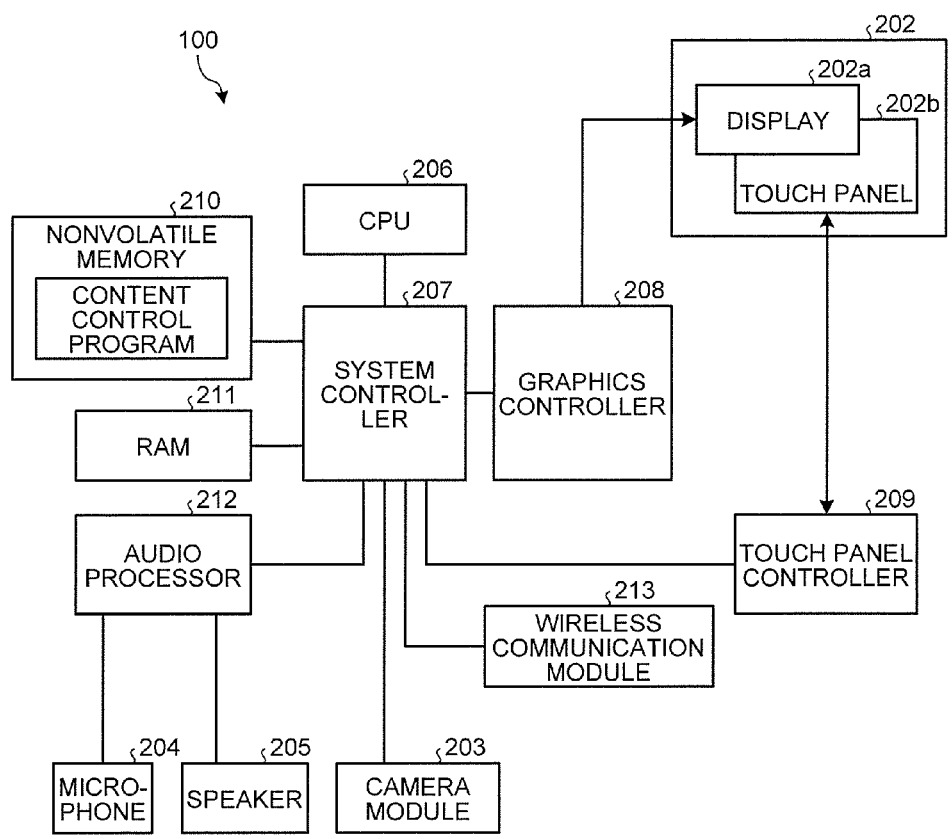
FIG. 2 is an exemplary block diagram of one example of a hardware configuration of a tablet computer in the first embodiment.

FIG. 2 is a block diagram illustrating an example of a hardware configuration of the tablet terminal 100. As illustrated in FIG. 2, the tablet terminal 100 comprises a display module 202, a camera module 203, a microphone 204, a speaker 205, a central processing unit (CPU) 206, a system controller 207, a graphics controller 208, a touch panel controller 209, a nonvolatile memory 210, a random access memory (RAM) 211, an audio processor 212, and a wireless communication module 213.

The display module 202 is configured as what is called a touchscreen that combines a display 202*a* with a touch panel 202*b*. The display 202*a* is, for example, a liquid crystal display (LCD) or an organic electroluminescence (EL) display. The touch panel 202*b* detects a position (touch position) on a display screen of the display 202*a* touched by a finger of the user, a stylus pen, or the like.

The CPU 206 is a processor that controls operation of the tablet terminal 100 in an integrated manner. The CPU 206 controls each module of the tablet terminal 100 via the system controller 207. The nonvolatile memory 210 stores an operation system, various application programs, various types of data necessary for executing programs, and the like. The RAM 211 provides, as a main memory of the tablet terminal 100, a work area used when the CPU 206 executes the programs.

The CPU 206 executes, for example, the operation system and the various application programs that are loaded from the nonvolatile memory 210 into the RAM 211 so as to achieve the function for controlling each module of the tablet terminal 100.

The system controller 207 has a built-in memory controller that controls access to the nonvolatile memory 210 and the RAM 211. In addition, the system controller 207 comprises a function to communicate with the graphics controller 208, the touch panel controller 209, and the audio processor 212. The system controller 207 also comprises a function to receive image information from the camera module 203. The system controller 207 further comprises a function to acquire various types of information from outside of the tablet terminal 100 by using the wireless communication module 213.

The graphics controller 208 is a controller that controls the display 202*a* of the display module 202. The touch panel controller 209 controls the touch panel 202*b* to acquire therefrom coordinate data indicating the touch position by the user.

Under the control by the CPU 206, the audio processor 212 performs processing of outputting, from the speaker 205, sound such as an audio guidance generated by applying audio processing such as voice synthesis, and also performs processing to sound collected by the microphone 204.

Under the control by the CPU 206, the wireless communication module 213 performs wireless communication with other electronic devices.

Figure 3:
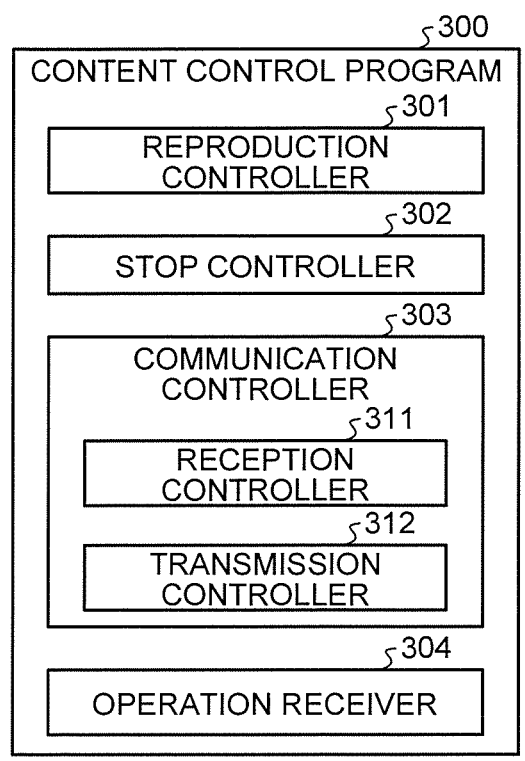
FIG. 3 is an exemplary block diagram of a configuration achieved by deploying a content control program in the first embodiment.

Next, a description will be made of a configuration achieved by loading a content control program from the nonvolatile memory 210 into the RAM 211. FIG. 3 is a block diagram illustrating the configuration achieved by deploying a content control program 300. As illustrated in FIG. 3, the content control program 300 implements a reproduction controller 301, a stop controller 302, a communication controller 303, and an operation receiver 304 in the RAM 211.

The communication controller 303 controls the wireless communication module 213 to communicate with the electronic devices (such as the television display device 150), the NAS 180, and the like that are connected via the network. The communication controller 303 comprises a reception controller 311 and a transmission controller 312.

The reception controller 311 controls reception of various types of data from the electronic devices (such as the television display device 150) and the NAS 180. For example, the reception controller 311 receives, from the NAS 180, a video content for which reproduction is to be controlled.

The transmission controller 312 controls transmission of various types of data to the electronic devices (such as the television display device 150) and the NAS 180. For example, the transmission controller 312 transmits, to the television display device 150, an instruction to reproduce a predetermined type of information of a video content comprising a plurality of types of information (such as a video image, a sound, and a caption). Here, the video content is stored in the NAS 180.

The operation receiver 304 accepts an operation from the user via the touch panel 202*b*.

When the reception controller 311 has received a video content stored in the NAS 180, the reproduction controller 301 reproduces the video content. The reproduction controller 301 according to the present embodiment reproduces at least one of video image data, audio data, and caption data included in the video content. For example, the reproduction controller 301 can reproduce only the audio data included in the video content.

The stop controller 302 stops reproduction of the video content which has been started by the reproduction controller 301. The stop control is performed, for example, when the operation receiver 304 receives an operation to stop the reproduction. In the present embodiment, when the reproduction of at least one of the video image data, the audio data, and the caption data has been started by the reproduction controller 301, the stop controller 302 stops the reproduction of the at least one of the video image data, the audio data, and the caption data. For example, when only the audio data of the video content is reproduced, the stop controller 302 stops the reproduction of the audio data.

In the case in which a reproduction of first data (such as the audio data) included in the video content by the tablet terminal 100 is synchronized with a reproduction of second data (such as the video image data) included in the video content by the television display device 150, if the stop controller 302 has stopped the reproduction of the first data, the reproduction of the second data can be stopped by the television display device 150. For example, if the stop controller 302 stops the reproduction of the audio data of the video content, the transmission controller 312 according to the present embodiment transmits an instruction to stop the reproduction of the video image data of the video content to the television display device 150.

Moreover, in the case in which the reproduction of the first data (such as the audio data) included in the video content by the tablet terminal 100 is synchronized with the reproduction of the second data (such as the video image data) included in the video content by the television display device 150, when the stop controller 302 has stopped the reproduction of the first data, the television display device 150 can be controlled so as to start reproducing the first data together with the second data. For example, if the stop controller 302 stops the reproduction of the first data of the video content, the transmission controller 312 according to the present embodiment transmits, to the television display device 150, an instruction to reproduce the first data of the video content from the position at which the reproduction of the first data of the video content has stopped.

Note that the data to be subjected to the stop control or the reproduction control is not limited to the audio data, the video image data, and the caption data, but can be any data included in the content.

In addition, in the present embodiment, when the video content is reproduced by a plurality of the electronic devices (such as the tablet terminal 100 and the television display device 150), the reproduction position of each type of data is corrected so as to synchronize the video image data with the audio data.

For example, it can be considered that the reception controller 311 receives the reproduction position of video image data of a video content that is being reproduced by another electronic device (for example, the television display device 150), and, based on the reproduction position of the video image data received by the reception controller 311, the reproduction controller 301 corrects the reproduction position of audio data for which reproduction thereof has been started.

Figure 4:
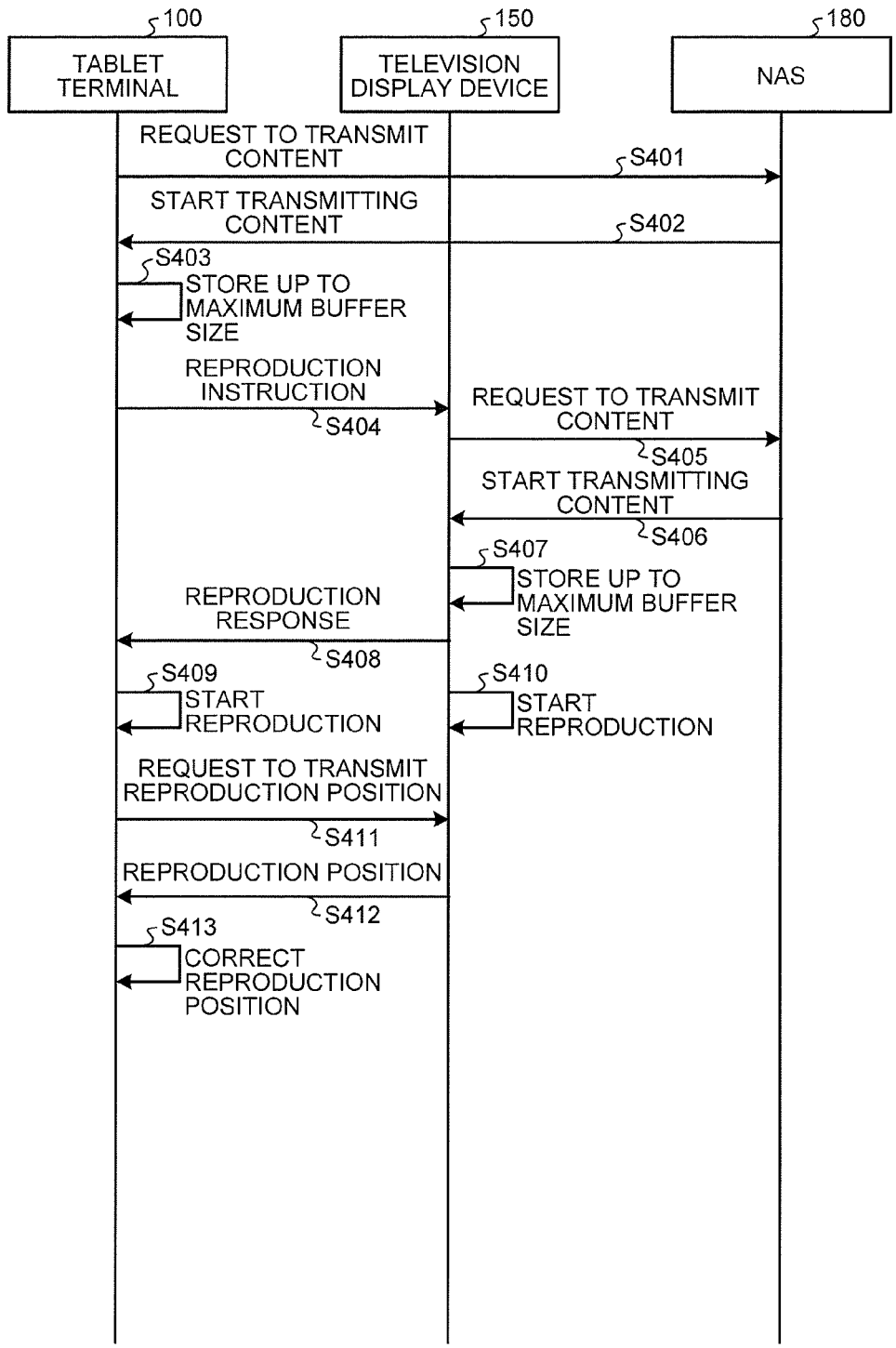
FIG. 4 is an exemplary sequence diagram of a reproduction processing of a video content in the first embodiment.

Next, a description will be made of the reproduction processing of the video content in the network system according to the present embodiment. FIG. 4 is a sequence diagram illustrating a procedure of the above-mentioned processing in the network system according to the present embodiment.

First, the transmission controller 312 of the tablet terminal 100 requests the NAS 180 to transmit a video content (S401). In response, the NAS 180 starts transmitting the video content to the tablet terminal 100 (S402).

Then, the reception controller 311 of the tablet terminal 100 receives the video content transmitted from the NAS 180, and stores it up to a maximum buffer size (S403). This is for the purpose of making the tablet terminal 100 ready to start reproducing the data. In conjunction with the storing into the buffer, the transmission controller 312 instructs the television display device 150 to reproduce the video content (S404).

The instruction to reproduce the video content includes, in addition to information for identifying the video content to be reproduced, a position of start of the reproduction and a reproduced data identification flag. The reproduced data identification flag is defined to be a flag that identifies data to be reproduced from data such as the video image data, the audio data, and the caption data. This sequence diagram illustrates a case in which the reproduced data identification flag instructs the television display device 150 to reproduce the video image data.

In response to this transmission request, a transmission controller of the television display device 150 requests the NAS 180 to transmit a video content (S405). In response, the NAS 180 starts transmitting the video content to the television display device 150 (S406).

Then, a receiver of the television display device 150 receives the video content transmitted from the NAS 180, and stores it up to a maximum buffer size (S407).

Then, after the storage is finished, the transmission controller of the television display device 150 transmits, to the tablet terminal 100, a response indicating that the data can be reproduced (S408).

Accordingly, the reproduction controller 301 of the tablet terminal 100 starts reproducing the audio data of the video content (S409). On the side of the television display device 150, a reproduction controller of the television display device 150 starts reproducing the video image data of the video content (S410).

There is a possibility that the reproduction of the audio data of the tablet terminal 100 is mismatched with the reproduction of the video image data of the television display device 150. Therefore, synchronization of the data is performed between the tablet terminal 100 and the television display device 150.

For this synchronization, the transmission controller 312 of the tablet terminal 100 requests the television display device 150 to transmit the reproduction position of the video content (S411). In response to this request, the transmission controller of the television display device 150 transmits the reproduction position of the video content (S412).

Then, based on the received reproduction position, the reproduction controller 301 of the tablet terminal 100 determines an amount of mismatch, and corrects the reproduction position of the audio data so as to synchronize the audio data with the video image data that is being reproduced by the television display device 150 (S413).

By using the processing procedure described above, it is possible to reproduce each of a plurality of types of data included in the video content on each of the different electronic devices. Also, by performing the correction based on the reproduction position, it is possible to synchronize the reproduction of the plurality of types of data performed by the electronic devices. Note that the timing of correcting the mismatch is not limited, but the correction may be periodically performed afterward.

Figure 5:
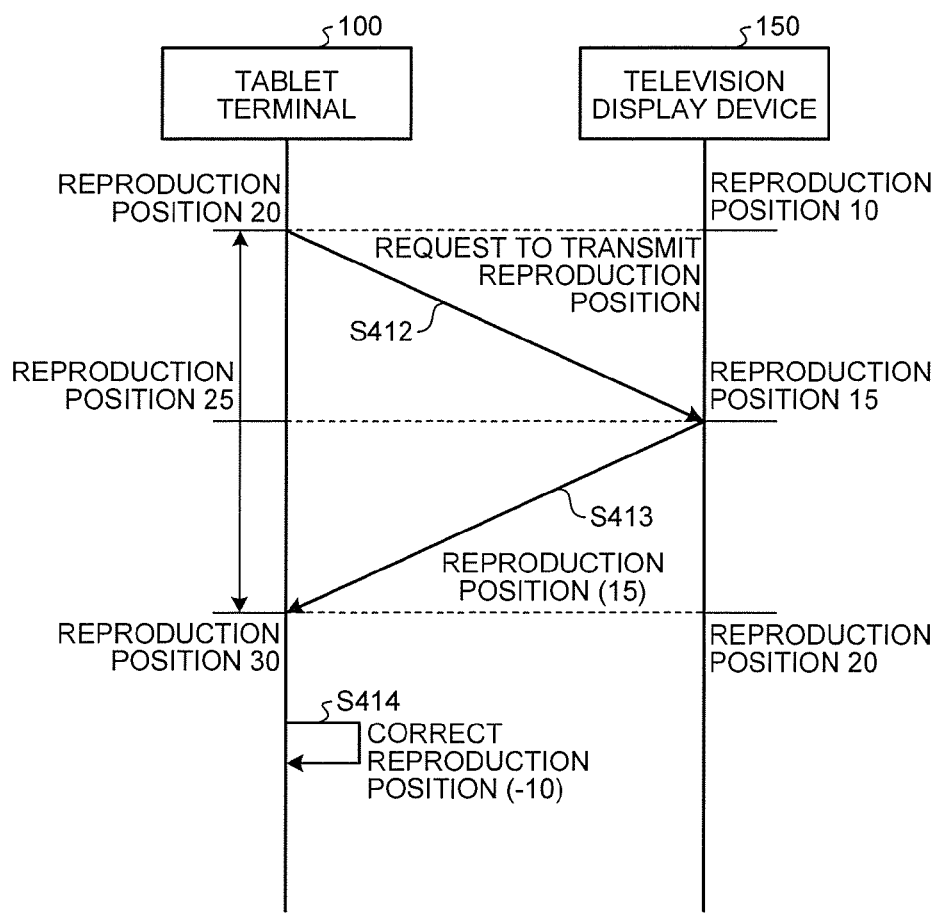
FIG. 5 is an exemplary sequence diagram of a correction processing for correcting a mismatch between audio data and video image data in the first embodiment.

Next, a description will be made of the correction processing of the mismatch between the audio data and the video image data in the network system according to the present embodiment. FIG. 5 is a sequence diagram illustrating the procedure of the above-mentioned processing in the network system according to the present embodiment.

First, the transmission controller 312 of the tablet terminal 100 requests the television display device 150 to transmit the reproduction position of the video content (S412). Assume that, at this time, the reproduction position on the tablet terminal 100 is '20', and the reproduction position on the television display device 150 is '10'. In this manner, assume that the television display device 150 delayed by '10'.

Then, assume that, when the transmission request of the reproduction position is received, the reproduction position on the television display device 150 is '15', and the reproduction position on the tablet terminal 100 is '25'.

Accordingly, the transmission controller of the television display device 150 transmits the reproduction position '15' of the video content (S413).

Then, assume that the reproduction position on the tablet terminal 100 has reached '30' when the reception controller 311 of the tablet terminal 100 receives the reproduction position '15' of the video content.

Then, based on the received reproduction position '15', the reproduction controller 301 of the tablet terminal 100 determines the amount of mismatch to be '10', and corrects the reproduction position of the audio data by '−10' so as to synchronize the audio data with the video image data that is being reproduced by the television display device 150 (S414).

In other words, a delay time of the network is considered to be defined as the difference between the reproduction position '30' on the tablet terminal 100 at the time of receiving the reproduction position response and the reproduction position '20' on the tablet terminal 100 at the time of transmitting the reproduction position acquisition request. Accordingly, the time when the reproduction position acquisition request has reached the television display device 150 is considered to be the reproduction position '25' that is the time in the middle. Consequently, the amount of correction can be calculated by Expression (1) given below.

$$\text{Received reproduction position} - (\text{reproduction position of tablet terminal 100 at the time of transmitting reproduction position acquisition request} + (\text{reproduction position of tablet terminal 100 at the time of receiving response} - \text{reproduction position of tablet terminal 100 at the time of transmitting reproduction position acquisition request})/2) \quad (1)$$

The reproduction controller 301 substitutes the specific numerical values into Expression (1) to calculate the amount of correction as 15−(20+(30−20)/2)=−10. Performing the correction by the calculated amount of correction can synchronize the tablet terminal 100 with the television display device 150.

Figure 6:
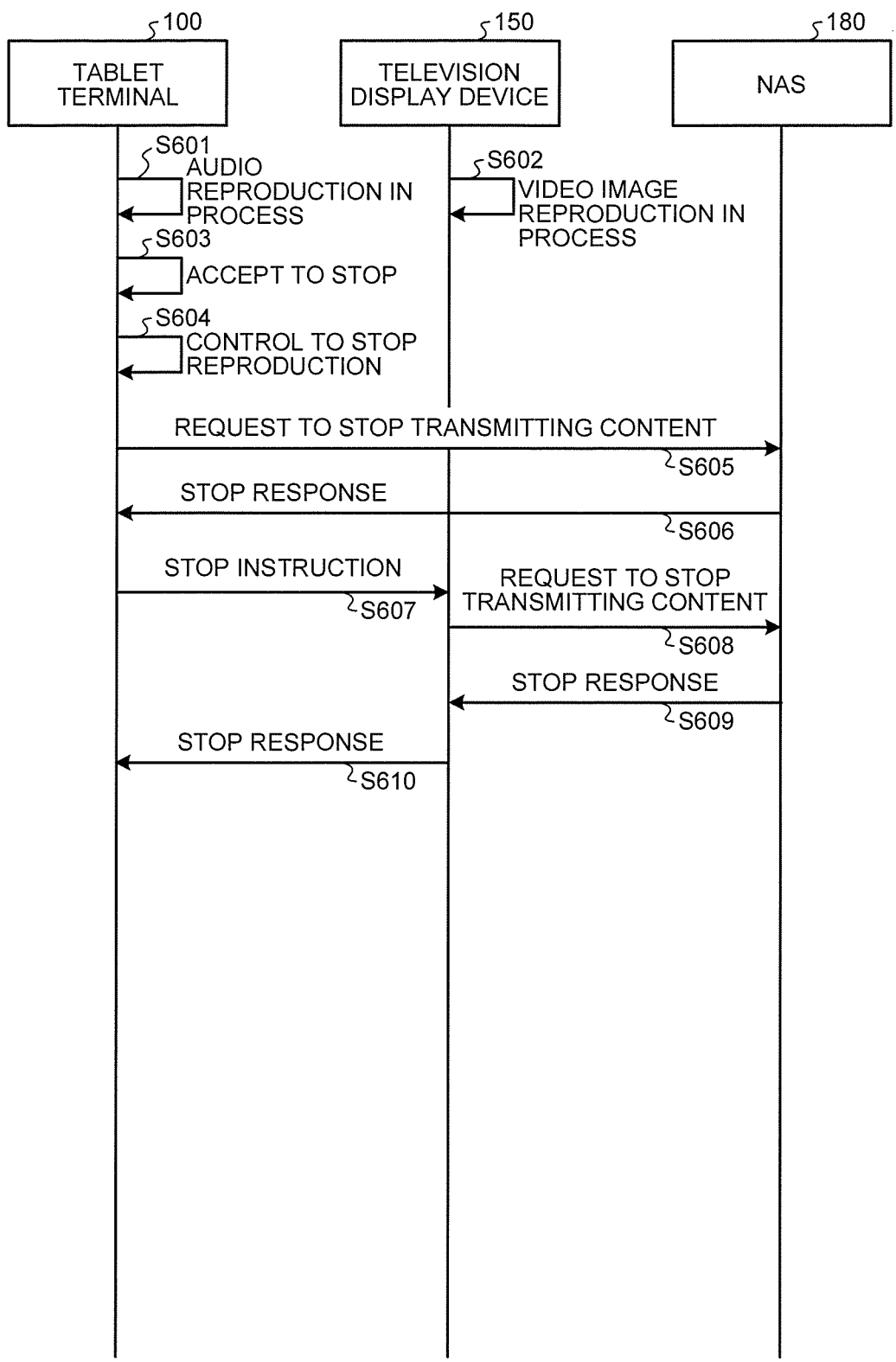
FIG. 6 is an exemplary sequence diagram of a stop processing of the video content in the first embodiment.

Next, a description will be made of the stop processing of the video content in the network system according to the present embodiment. FIG. 6 is a sequence diagram illustrating the procedure of the above-mentioned processing in the network system according to the present embodiment. The example illustrated in FIG. 6 assumes that the reproduction of the video image data of the television display device 150 is stopped as soon as the reproduction of the audio data of the tablet terminal 100 is stopped.

Assume that the reproduction controller 301 of the tablet terminal 100 is already in the process of reproducing the audio data of the video content (S601) while the reproduction controller of the television display device 150 is already in the process of reproducing the audio data of the video content (S602).

Then, assume that the operation receiver 304 of the tablet terminal 100 accepts a stop operation of the video content from the user (S603). Accordingly, the stop controller 302 stops the reproduction of the audio data of the video content (S604).

Then, the transmission controller 312 of the tablet terminal 100 requests the NAS 180 to stop transmitting the video content that has been reproduced (S605). Consequently, the reception controller 311 of the tablet terminal 100 receives a stop response from the NAS 180 (S606).

In addition, the transmission controller 312 of the tablet terminal 100 instructs the television display device 150 to stop the reproduction of the video content (S607). Accordingly, the television display device 150 stops the reproduction of the video content, and then requests the NAS 180 to stop transmitting the video content that has been reproduced (S608). Thereafter, the reception controller of the television display device 150 receives a stop response from the NAS 180 (S609).

Thereafter, the television display device 150 transmits, to the tablet terminal 100, a response indicating that the reproduction of the video content has stopped (S610). Then, upon receipt of the response, the reception controller 311 of the tablet terminal 100 determines that the reproduction of the video content has stopped, and thus terminates the processing.

By virtue of the processing procedure described above, the user can stop the tablet terminal 100 and the television display device 150 in synchronization with each other only by operating the tablet terminal 100. As a result, operational burden of the user can be reduced.

Figure 7:
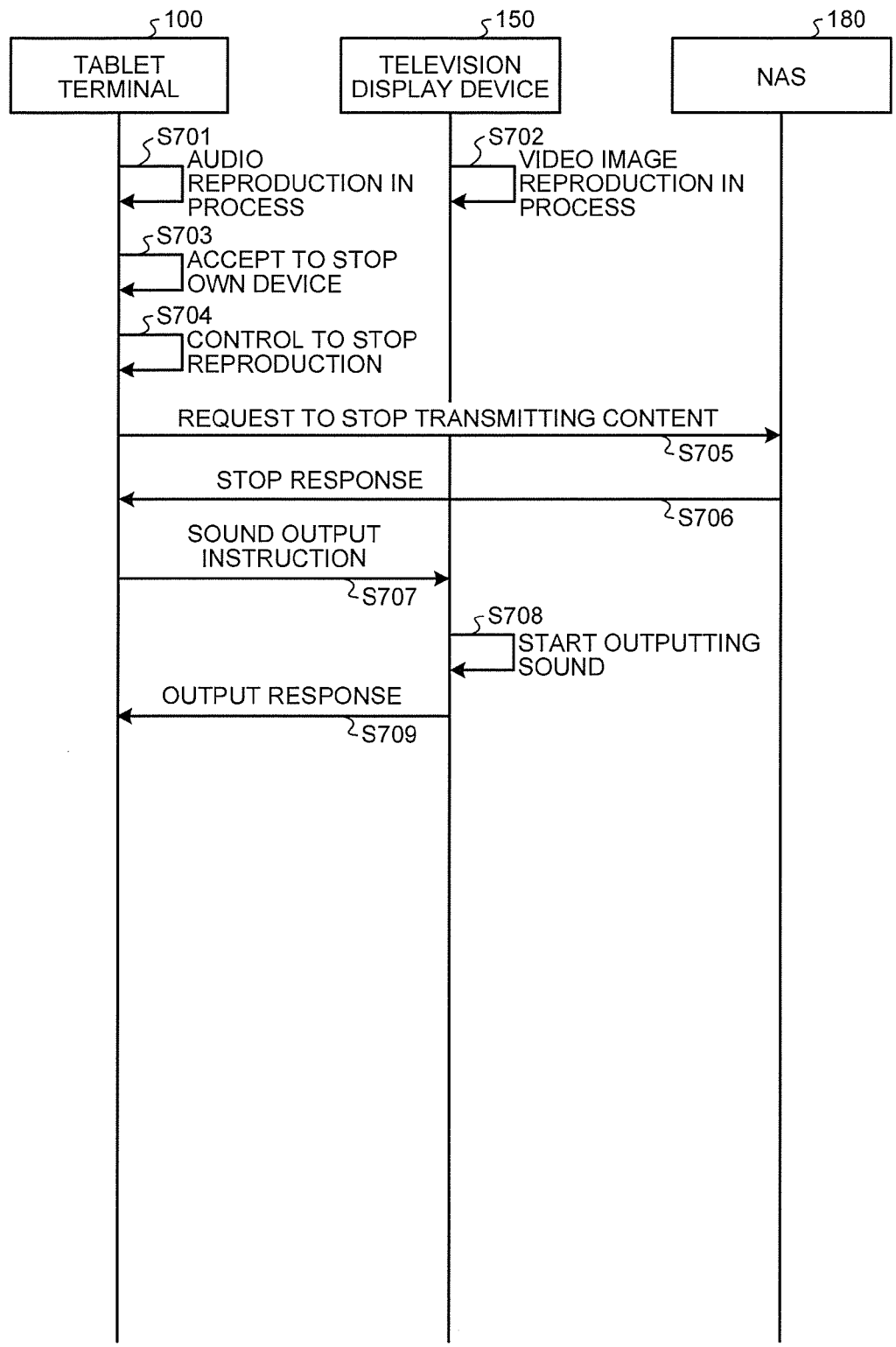
FIG. 7 is an exemplary sequence diagram of a processing for when the reproduction of the video content is continued on a television display device 150 in the first embodiment.

Next, a description will be made of a procedure of stopping the tablet terminal 100 and continuing the reproduction of the video content on the television display device 150 in the network system according to the present embodiment. FIG. 7 is a sequence diagram illustrating the procedure of the above-mentioned processing in the network system according to the present embodiment.

Assume that the reproduction controller 301 of the tablet terminal 100 is already in the process of reproducing the audio data of the video content (S701) while the reproduction controller of the television display device 150 is already in the process of reproducing the audio data of the video image data (S702).

Then, assume that the operation receiver 304 of the tablet terminal 100 accepts a stop operation of the user's own device (tablet terminal 100) from the user (S703). Accordingly, the stop controller 302 stops the reproduction of the audio data of the video content (S704).

Then, the transmission controller 312 of the tablet terminal 100 requests the NAS 180 to stop transmitting the video content that has been reproduced (S705). Consequently, the reception controller 311 of the tablet terminal 100 receives a stop response from the NAS 180 (S706).

In addition, the transmission controller 312 of the tablet terminal 100 instructs the television display device 150 to output sound of the video content (S707). Accordingly, the reproduction controller of the television display device 150 starts outputting the audio data of the video content (S708). Thus, the television display device 150 reproduces the audio data and the video image data of the video content.

Thereafter, the television display device 150 transmits, to the tablet terminal 100, a response indicating that outputting of the audio data of the video content has started (S709). Then, upon receipt of the response, the reception controller 311 of the tablet terminal 100 determines that the switching in the reproduction of the video content has been completed, and thus executes the termination processing.

By virtue of the processing procedure described above, the user can perform the switching processing in the reproduction of the video content only by performing the stop operation on the tablet terminal 100. As a result, the operational burden of the user can be reduced.

Note that, although the present embodiment has described the example in which the content reproduced by the electronic devices is a video content, the type of the content is not limited. The content only needs to be a content in which a sound or an image changes with time, and can be, for example, an audio content. It is conceivable that the audio content includes a plurality of types of audio data, and that, for example, a first electronic device reproduces first audio data while a second electronic device reproduces second audio data.

The present embodiment has described the example of operating the tablet terminal 100 so as to synchronize the reproduction between the tablet terminal 100 and the television display device 150. The embodiment is not limited to this aspect, but, for example, the television display device 150 may be operated so as to synchronize the reproduction between the tablet terminal 100 and the television display device 150. Moreover, the reproduction may be synchronized, for example, among more than one of the tablet computers or among more than one of the television display devices.

Furthermore, the electronic device is not limited to the tablet computer or the television display device, but only needs to be an electronic device, such as a mobile phone handset or a PC, that can communicate with another electronic device.

The present embodiment has also described the example of reproducing the audio data on the tablet terminal 100 while reproducing the video image data on the television display device 150. However, the embodiment is not limited to such an example, but, for example, it is possible to reproduce caption data of a moving image content on the tablet terminal 100 while reproducing video image data thereof on the television display device 150. It is further possible to reproduce sub-audio data of a bilingual broadcast on the tablet terminal 100 while reproducing video image data and main audio data on the television display device 150.

Although the present embodiment has also described the example of executing the content control program on the tablet computer, the content control program is not limited to be executed on the tablet computer, but may be executed on the television display device.

The first embodiment has described the example in which, among the electronic devices that reproduces data included in the content, the television display device 150 reproduces the video image data while the tablet terminal 100 reproduces the audio data. However, a plurality of electronic devices may reproduce a plurality of types of audio data or video image data. Therefore, in a second embodiment, a description will be made of an example in which the television display device 150 reproduces video image data while a plurality of tablet terminals reproduce mutually different types of audio data.

In this manner, the relationship between the electronic device that reproduces the video image data and the electronic devices that reproduce the audio data may be made as one-to-many relationship. For example, when a moving image content including dubbed voices in a plurality of languages is reproduced, the relation can be used in the case of reproducing the video image data on one television display device while reproducing each of the different types of audio data on each of the tablet terminals. Note that, as another example, it is possible to reproduce the audio data on one of the electronic devices (such as the tablet computer) while reproducing the video image data on a plurality of the electronic devices (such as the television display devices).

Figure 8:
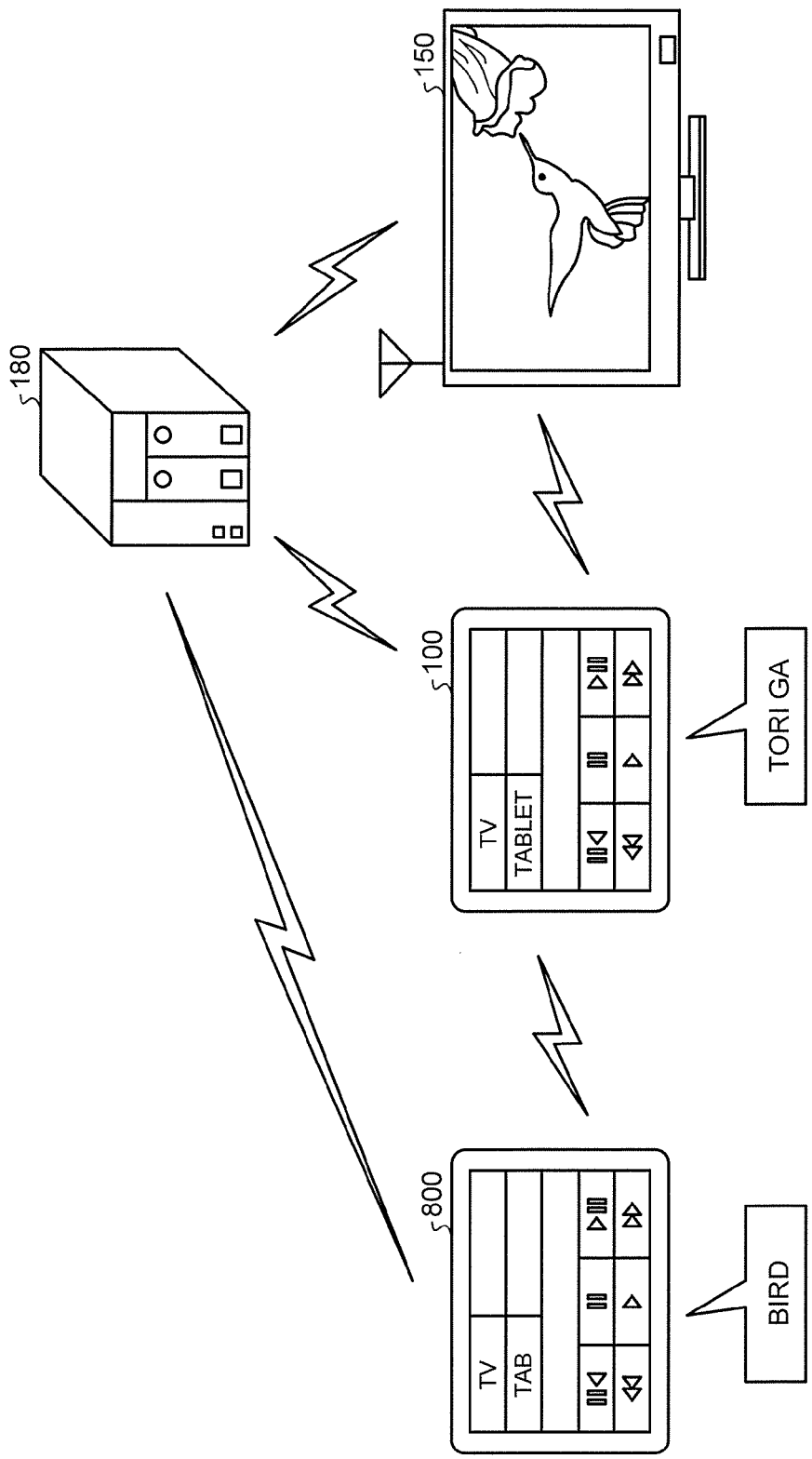
FIG. 8 is an exemplary diagram of a configuration of a network system according to a second embodiment.

In the network system illustrated in FIG. 8, a first tablet terminal 100, a second tablet terminal 800, the television display device 150, and the network attached storage (NAS) 180 are connected to each other via the network. A network diagram is illustrated in FIG. 8 as an example to which the second tablet terminal 800 is added compared with the network diagram illustrated in FIG. 1.

The second embodiment assumes that the first tablet terminal 100 and the second tablet terminal 800 are used by different users. The second embodiment assumes an example in which the video image data displayed on the television display device 150 is shared between the first tablet terminal 100 and the second tablet terminal 800, which in turn output mutually different types of audio data. For example, it is conceivable that the first tablet terminal 100 outputs audio data in Japanese while the second tablet terminal 800 outputs audio data in English.

Note that, although the present embodiment describes the example in which there are more than one tablet terminal while there is only one television display device, there can be more than one television display device that reproduces the video image data.

Note that the second tablet terminal 800 is assumed to comprise the same configuration as that of the (first) tablet terminal 100 illustrated in the first embodiment, and thus, description thereof is omitted.

Accordingly, the same method as that of the first embodiment can allow the second tablet terminal 800 to make the television display device 150 reproduce the video image data, and to reproduce the audio data on itself.

Also, in the case in which the second tablet terminal 800 reproduces a video content while the first tablet terminal 100 has already reproduced the video content, the second tablet terminal 800 can reproduce audio data in synchronization with the first tablet terminal 100. Note that the video content reproduced in the second embodiment may be a content different from the video content reproduced in the first embodiment. (For example, it is possible to assume the video content reproduced in the first embodiment as a first video content and the video content reproduced in the second embodiment as a second video content.)

Figure 9:
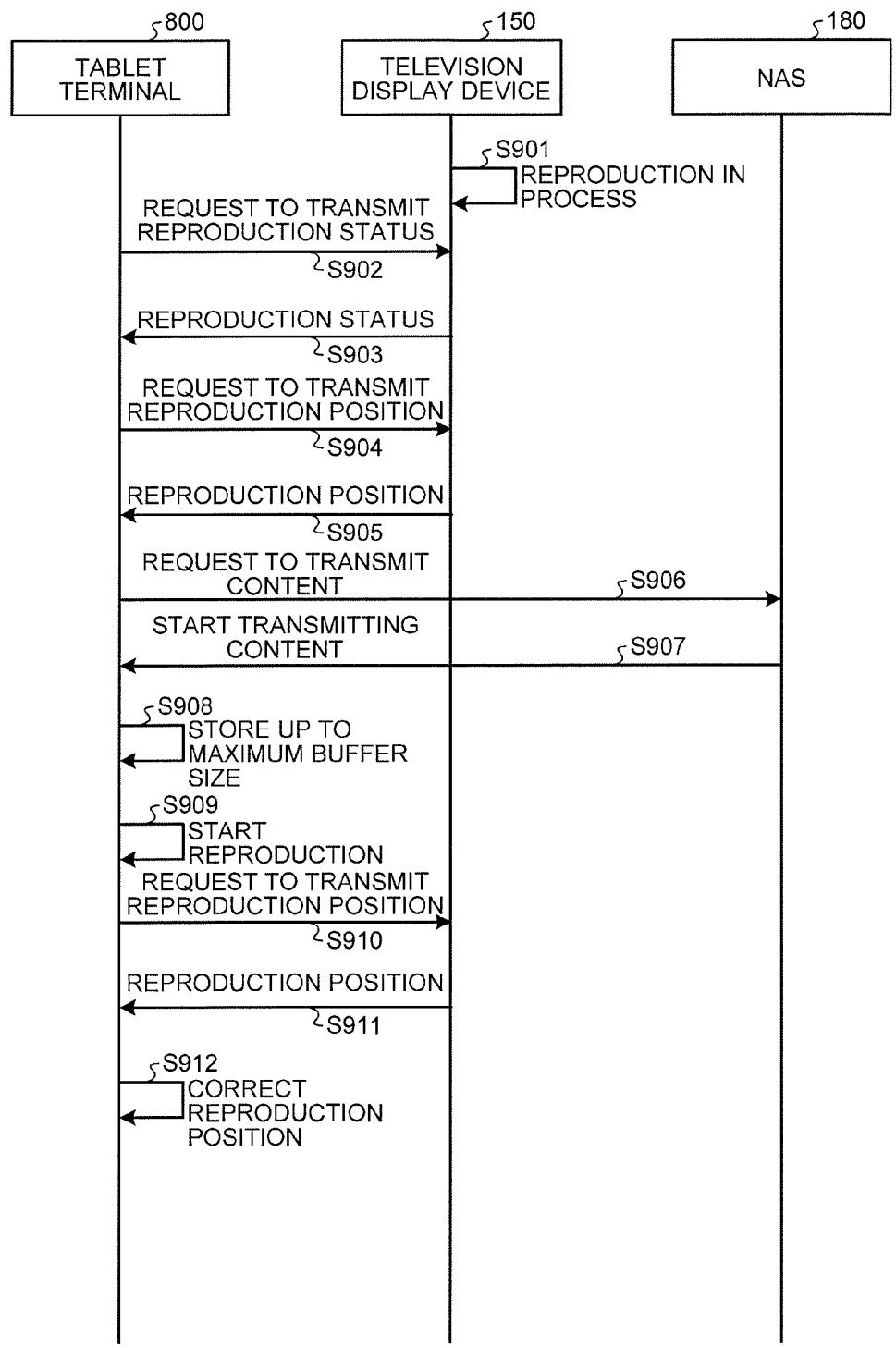
FIG. 9 is an exemplary sequence diagram of a reproduction processing of a video content in the second embodiment.

Next, a description will be made of processing in the case in which the second tablet terminal 800 reproduces the video content while the first tablet terminal 100 has been reproducing the video content. FIG. 9 is a sequence diagram illustrating a procedure of the above-mentioned processing in the network system according to the present embodiment.

In the sequence diagram illustrated in FIG. 9, the television display device 150 is assumed to be already in the process of reproducing the video image data due to the control from the first tablet terminal 100 (S901). Note that, at the time of starting the reproduction, the first tablet terminal 100 and the television display device 150 are assumed to have performed the same processing as is illustrated in FIG. 4 of the first embodiment, and thus, description of the processing is omitted.

Thus, the sequence diagram is illustrated in FIG. 9 as an example in which, after the first tablet terminal 100 has started the reproduction, another tablet computer (such as the second tablet terminal 800) starts the same moving image content as that of the first tablet terminal 100 with a different type of audio data.

The transmission controller 312 of the second tablet terminal 800 requests the television display device 150 to transmit the reproduction status of the video content (S902).

In response, the television display device 150 transmits the reproduction position of the video content to the second tablet terminal 800 (S903). The reproduction status includes, in addition to information whether the reproduction is in process, information to identify the content being reproduced. This information allows the second tablet terminal 800 to recognize that the video content intended to be reproduced has already been reproduced. Note that, if the television display device 150 is not performing the reproduction, the same processing as that of the FIG. 4 of the first embodiment is performed. If the video content reproduced by the television display device 150 does not coincide with the video content intended to be reproduced by the second tablet terminal 800, the processing to be described below is not performed because the content intended to be reproduced is a different content.

Then, the transmission controller 312 of the second tablet terminal 800 requests the television display device 150 to transmit the reproduction position of the video content (S904). In response, the television display device 150 transmits the reproduction position of the video content to the second tablet terminal 800 (S905).

As a result, the reception controller 311 of the second tablet terminal 800 receives the reproduction position of the video image data of the video content that is reproduced on the television display device 150. Thus, the second tablet terminal 800 can recognize the reproduction position of the video content. The reproduction position can be obtained by using the same method as that of the first embodiment, and thus, description of the method for recognizing the reproduction position is omitted.

Then, the transmission controller 312 of the second tablet terminal 800 requests the NAS 180 to transmit the video content (S906). In the request for transmitting the video content, transmission of the video content is requested from a reproduction position at which the second tablet terminal 800 can be synchronized with the television display device 150 that has already started the reproduction.

In response, the NAS 180 starts transmitting, to the second tablet terminal 800, the video content from the reproduction position specified by the reproduction request (S907).

Then, the reception controller 311 of the second tablet terminal 800 receives the video content transmitted from the NAS 180, and stores it up to a maximum buffer size (S908).

Thereafter, based on the reproduction position received from the television display device 150, the reproduction controller 301 of the second tablet terminal 800 starts reproducing the audio data (such as the audio data in English) of the video content stored in the buffer from the reproduction position of the video image data that is being reproduced by the television display device 150 (S909).

There is a possibility that the reproduction of the audio data of the second tablet terminal 800 is mismatched with the reproduction of the video image data of the television display device 150. Therefore, synchronization of the data is performed between the second tablet terminal 800 and the television display device 150.

For this synchronization, the transmission controller 312 of the second tablet terminal 800 requests the television display device 150 to transmit the reproduction position of the video content (S910). In response to this request, the transmission controller of the television display device 150 transmits the reproduction position of the video content (S911).

Then, based on the received reproduction position, the reproduction controller 301 of the second tablet terminal 800 determines an amount of mismatch, and corrects the reproduction position of the audio data so as to synchronize the audio data with the video image data that has already started being reproduced on the television display device 150 (S912).

By using the processing described above, it is possible to reproduce each of a plurality of types of data of the video content on each of the different electronic devices. Also, by performing the correction based on the reproduction position, it is possible to synchronize the reproduction of the plurality of types of data performed on the electronic devices. In the example illustrated in FIG. 9, description has been made of the case in which the second tablet terminal 800 inquires the television display device 150 about the reproduction status and the reproduction position. However, the destination of inquiry is not limited to the television display device 150, but, for example, the second tablet terminal 800 may inquire the first tablet terminal 100 about the reproduction status and the reproduction position.

By using the processing described above, the second tablet terminal 800 can reproduce the video content from the same position as that of the first tablet terminal 100. In that case, the reproduction can be performed with a different type of audio data, in the present embodiment. While the present embodiment has been described with respect to the second tablet terminal 800, subsequent third and fourth tablet terminals can also reproduce the video content by executing the same processing.

In the embodiment described above, the description has been made of the example in which the user's own device corrects the reproduction position thereof when the reproduction is to be synchronized with that of another electronic device. However, the target of correction is not limited to the user's own device, but the correction may be controlled so that the correction is performed on other device. This is very effective particularly when an electronic device (such as a tablet computer) controls a plurality of electronic devices to reproduce data included in a video content.

Figure 10:
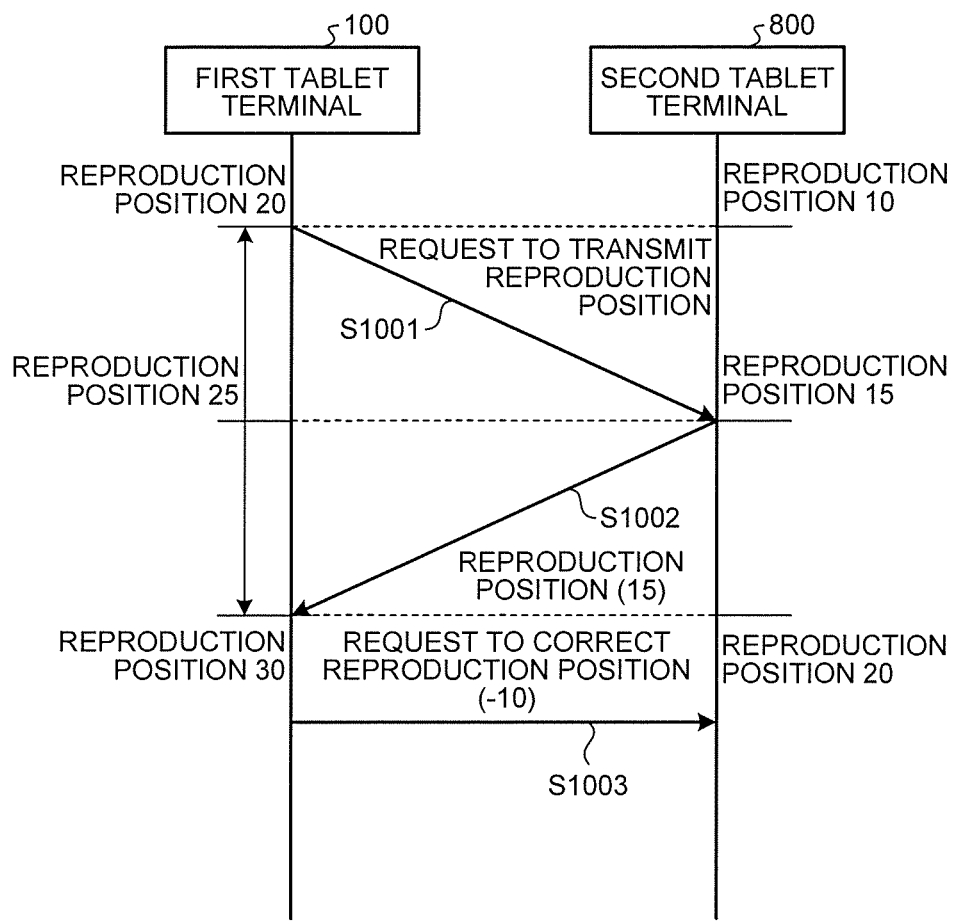
FIG. 10 is an exemplary sequence diagram of a correction processing for correcting a mismatch between audio data and video image data according to a modification.

A description will be made of a correction processing of the mismatch between the audio data and the video image data in the network system according to a modification. FIG. 10 is a sequence diagram illustrating the procedure of the above-mentioned processing in the network system according to the present modification. The present modification assumes an example in which the first tablet terminal 100 corrects the mismatch in the reproduction position on the second tablet terminal 800.

First, the transmission controller 312 of the first tablet terminal 100 requests the second tablet terminal 800 to transmit the reproduction position of the video content (S1001). Assume that, at this time, the reproduction position on the first tablet terminal 100 is '20', and the reproduction position on the second tablet terminal 800 is '10'. In this manner, assume that the second tablet terminal 800 is delayed by '10'.

Then, assume that, when the transmission request of the reproduction position is received, the reproduction position on the second tablet terminal 800 is '15', and the reproduction position on the first tablet terminal 100 is '25'.

Accordingly, the transmission controller 312 of the second tablet terminal 800 transmits the reproduction position '15' of the video content (S1002).

Then, assume that, the reproduction position on the first tablet terminal 100 has reached '30' when the reception controller 311 of the first tablet terminal 100 receives the reproduction position '15' of the video content.

Then, based on the received reproduction position '15', the reproduction controller 301 of the first tablet terminal 100 determines the amount of mismatch to be '10'. Then, the transmission controller 312 of the first tablet terminal 100 requests (instructs) the second tablet terminal 800 to correct the reproduction position of the video content by '−10' (S1003). As a result, the reproduction controller 301 of the second tablet terminal 800 can correct the reproduction position of the video content by '−10'.

According to the embodiments and the modification described above, it is possible to reproduce each of a plurality of types of data (such as only video image data or only audio data) included in a single video content on each of a plurality of electronic devices. As a result, it is possible to reproduce a content depending on the need of the user. In that case, one of the electronic devices controls the other electronic devices to each reproduce a different type of data, whereby the operational burden of the user can be reduced.

The content control program to be executed in the electronic device (such as the tablet computer) of the above-described embodiments is provided by being recorded in a computer-readable recording medium, such as a CD-ROM, a flexible disk (FD), a CD-R, or a digital versatile disc (DVD), as files in an installable or an executable format.

The content control program to be executed in the electronic device (such as the tablet computer) of the above-described embodiments may alternatively be configured to be provided by being stored on a computer connected to a network such as the Internet and by being downloaded via the network. The content control program to be executed in the electronic device (such as the tablet computer) of the above-described embodiments may also be configured to be provided or distributed via a network such as the Internet.

The content control program to be executed in the electronic device (such as the tablet computer) of the above-described embodiments may also be configured to be provided by being preinstalled in a ROM or the like.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a reproduction controller configured to reproduce either one of first information and second information comprised in a first content, the first information corresponding to video image information of the first content, the second information corresponding to audio information or caption information of the first content; and
   a transmitter configured to transmit, to other electronic device, an instruction for reproducing other one of the first information and the second information in the other electronic device, wherein the other one of the first information and the second information is different from the either one of the first information and the second information,
   wherein the reproduction controller is configured to reproduce the either one of the first information and the second information in synchronization with the other one of the first information and the second information reproduced in the other electronic device.

2. The electronic device of claim 1, further comprising a stop controller configured to stop the reproduction of the either one of the first information and the second information, wherein
   the transmitter is configured to transmit an instruction to stop the reproduction of the other one of the first information and the second information to the other electronic device if the stop controller stops the reproduction of the either one of the first information and the second information.

3. The electronic device of claim 1, further comprising a stop controller configured to stop the reproduction of the either one of the first information and the second information, wherein
   the transmitter is configured to transmit, if the stop controller stops the reproduction of the either one of the first information and the second information, an instruction to reproduce the either one of the first information and the second information in the other electronic device from a timing determined by a timing at which a reproduction of the either one of the first information and the second information is stopped, to the other electronic device.

4. The electronic device of claim 1, further comprising a receiver configured to receive a reproduction position of either one of third information and fourth information comprised in a second content that is being reproduced in the other electronic device, wherein
   the reproduction controller is configured to start reproducing other one of the third information and the fourth information, wherein the other one of the third information and the fourth information is different from the either one of the third information and the fourth information,
   a type of information of the either one of the third information and the fourth information is the same as a type of information of the other one of the first information and the second information, and
   a type of information of the other one of the third information and the fourth information is the same as a type of information of the either one of the first information and the second information.

5. The electronic device of claim 1, further comprising a receiver configured to receive a reproduction position of the either one of third information and fourth information comprised in a second content that is being reproduced in the other electronic device, wherein
   the reproduction controller is configured to correct, based on the reproduction position of the either one of the third information and the fourth information received by the receiver, a reproduction position of the other one of the third information and the fourth information for which reproduction has started,
   a type of information of the either one of the third information and the fourth information is the same as a type of information of the other one of the first information and the second information, and
   a type of information of the other one of the third information and the fourth information is the same as a type of information of the either one of the first information and the second information.

6. The electronic device of claim 5, wherein the transmitter is configured to transmit an instruction to correct the reproduction position of the either one of the third information and the fourth information to the other electronic device based on the reproduction position of the other one of the third information and the fourth information for which reproduction has started by the reproduction controller.

7. A method for controlling a content executed by an electronic device, the method comprising:
   reproducing either one of first information and second information comprised in a first content, the first information corresponding to video image information of the first content, the second information corresponding to audio information or caption information of the first content; and
   transmitting, to other electronic device, an instruction for reproducing other one of the first information and the second information in the other electronic device, wherein the other one of the first information and the second information is different from the either one of the first information and the second information,
   wherein at the reproducing, the either one of the first information and the second information is reproduced in synchronization with the other one of the first information and the second information reproduced in the other electronic device.

8. A computer program product having a non-transitory computer readable medium including programmed instructions, wherein the instructions, when executed by a computer, cause the computer to perform:
   reproducing either one of first information and second information comprised in a first content, the first information corresponding to video image information of the first content, the second information corresponding to audio information or caption information of the first content; and
   transmitting, to other electronic device, an instruction for reproducing other one of the first information and the second information in the other electronic device, wherein the either one of the first information and the second information is different from the other one of the first information and the second information,
   wherein at the reproducing, the either one of the first information and the second information is reproduced in synchronization with the other one of the first information and the second information reproduced in the other electronic device.

9. The method of claim 7, further comprising stopping the reproduction of the either one of the first information and the second information, wherein the transmitting comprises transmitting an instruction to stop the reproduction of the other one of the first information and the second information to the other electronic device if the reproduction of the either one of the first information and the second information is stopped.

10. The method of claim 7, further comprising stopping reproduction of the either one of the first information and the second information, wherein
the transmitting comprises transmitting, if reproduction of the one of the first information and the second information is stopped, an instruction to reproduce the either one of the first information and the second information in the other electronic device from a timing determined by a timing at which reproduction of the either one of the first information and the second information is stopped, to the other electronic device.

11. The method of claim 7, further comprising a receiver configured to receive a reproduction position of either one of third information and fourth information comprised in a second content that is being reproduced in the other electronic device, wherein
the reproducing comprises starting to reproduce other one of the third information and the fourth information, wherein the other one of the third information and the fourth information is different from the either one of the third information and the fourth information,
a type of information of the either one of the third information and the fourth information is the same as a type of information of the other one of the first information and the second information, and
a type of information of the other one of the third information and the fourth information is the same as a type of information of the either one of the first information and the second information.

12. The method of claim 7, further comprising receiving a reproduction position of either one of third information and fourth information comprised in a second content that is being reproduced in the other electronic device, wherein
the reproducing comprising correcting, based on the reproduction position of the either one of the third information and the fourth information received by the receiving, a reproduction position of other one of the third information and the fourth information for which reproduction has started, and
a type of information of the either one of the third information and the fourth information is the same as a type of information of the other one of the first information and the second information, and
a type of information of the other one of the third information and the fourth information is the same as a type of information of the either one of the first information and the second information.

13. The method of claim 12, wherein the transmitting comprises transmitting an instruction to correct the reproduction position of the either one of the third information and the fourth information to the other electronic device based on the reproduction position of the other one of the third information and the fourth information for which reproduction has started by the reproducing.

14. The computer program product of claim 8, further comprising stopping the reproduction of the either one of the first information and the second information, wherein
the transmitting comprises transmitting an instruction to stop the reproduction of the other one of the first information and the second information to the other electronic device if the reproduction of the either one of the first information and the second information is stopped.

15. The computer program product of claim 8, further comprising stopping reproduction of the either one of the first information and the second information, wherein
the transmitting comprises transmitting, if reproduction of the one of the first information and the second information is stopped, an instruction to reproduce the either one of the first information and the second information in the other electronic device from a timing determined by a timing at which reproduction of the either one of the first information and the second information is stopped, to the other electronic device.

16. The computer program product of claim 8, further comprising a receiver configured to receive a reproduction position of either one of third information and fourth information comprised in a second content that is being reproduced in the other electronic device, wherein
the reproducing comprises starting to reproduce other one of the third information and the fourth information, and
a type of information of the either one of the third information and the fourth information is the same as a type of information of the other one of the first information and the second information, and
a type of information of the other one of the third information and the fourth information is the same as a type of information of the either one of the first information and the second information.

17. The computer program product of claim 8, further comprising receiving a reproduction position of either one of third information and fourth information comprised in a second content that is being reproduced in the other electronic device, wherein
the reproducing comprising correcting, based on the reproduction position of the either one of the third information and the fourth information received by the receiving, a reproduction position of other one of the third information and the fourth information for which reproduction has started, and
a type of information of the either one of the third information and the fourth information is the same as a type of information of the other one of the first information and the second information, and
a type of information of the other one of the third information and the fourth information is the same as a type of information of the either one of the first information and the second information.

18. The computer program product of claim 17, wherein the transmitting comprises transmitting an instruction to correct the reproduction position of the either one of the third information and the fourth information to the other electronic device based on the reproduction position of the other one of the third information and the fourth information for which reproduction has started by the reproducing.

* * * * *